United States Patent [19]
Heibel et al.

[11] Patent Number: 5,772,290
[45] Date of Patent: Jun. 30, 1998

[54] VEHICLE BRAKE SYSTEM HAVING AN ELECTRONICALLY CONTROLLED BOOSTER

[75] Inventors: Helmut Heibel, Moschheim; Hans-Werner Renn, Andernach; Erwin Michels, Kail; Jens-Peter Kohrt, Koblenz; Werner Dieringer, Vallendar; Kurt Mohr, Halsenbach-Ehr, all of Germany

[73] Assignee: Lucas Industries public limited company, United Kingdom

[21] Appl. No.: 578,633

[22] PCT Filed: Jul. 27, 1994

[86] PCT No.: PCT/EP94/02481

§ 371 Date: Jan. 5, 1996

§ 102(e) Date: Jan. 5, 1996

[87] PCT Pub. No.: WO95/03966

PCT Pub. Date: Feb. 9, 1995

[30] Foreign Application Priority Data

| Jul. 27, 1993 | [DE] | Germany | 43 25 198.6 |
| Oct. 5, 1993 | [DE] | Germany | 43 33 986.7 |
| Jan. 12, 1994 | [DE] | Germany | 44 00 688.8 |

[51] Int. Cl.$^6$ .................................................. B60T 2/34
[52] U.S. Cl. ......................... 303/113.4; 303/125; 60/545
[58] Field of Search .................................. 303/3, 15, 20, 303/113.4, 114.3, 114.1, 125; 188/356, 357; 91/1; 60/545, 547.1

[56] References Cited

U.S. PATENT DOCUMENTS

| 5,372,409 | 12/1994 | Farr | 303/114.3 X |
| 5,556,173 | 9/1996 | Steiner et al. | 303/114.3 X |

FOREIGN PATENT DOCUMENTS

| 0327276A3 | 8/1989 | European Pat. Off. . |
| 0379329A2 | 7/1990 | European Pat. Off. . |
| 0417945A2 | 3/1991 | European Pat. Off. . |
| 2636905A1 | 3/1990 | France . |
| 3346140A1 | 7/1985 | Germany . |
| 3902215A1 | 8/1990 | Germany . |
| 9202154 U | 5/1992 | Germany . |
| 4217409A1 | 12/1993 | Germany . |
| 4309850A1 | 9/1994 | Germany . |
| 61-268560 | 11/1986 | Japan . |
| 62-037261 | 2/1987 | Japan . |

*Primary Examiner*—Lee W. Young
*Attorney, Agent, or Firm*—Wood, Herron & Evans, L.L.P.

[57] ABSTRACT

An apparatus for controlling the brake pressure in a vehicle brake system equipped with an electronically adjustable brake booster (10), comprising an actuator (22) which transmits the actuating movement of the brake pedal to a master brake cylinder and has assigned a path limiting element (80) which limits the axial actuating movement of the actuator (22) in that it is received between abutments (90, 92), the apparatus being characterized in that a switch is actuated by the path limiting element (80) together with one of the abutments (90), said switch supplying a signal to the brake booster when the path limiting element (80) abuts the one abutment (90).

17 Claims, 14 Drawing Sheets

VEHICLE BRAKE SYSTEM HAVING AN ELECTRONICALLY CONTROLLED BOOSTER

The invention concerns a vehicle brake system having an electronically adjustable brake booster.

The demand on vehicle brake systems having brake boosters is to optimally perform a braking operation initiated by the driver even if the driver's behavior is not always commensurate with the respective situation involved. To this end, electromagnetically actuated control means for additional air were provided which were activated in response to the actuation dynamics of the brake pedal (cf. the previously filed and post-published German patent applications P 42 17 409 and P 43 09 850 of the applicant).

In the case of an emergency braking, when the braking operation is enhanced by a brake booster, the boosting operation has been increased to an extent as allowed by the pressure differential in the individual chambers of the brake booster. The actuation velocity of the brake pedal was used as the triggering criterion. As soon as a given threshold value of the actuation velocity was surpassed, the maximally possible amplification of the brake boosting operation was initiated. Although this operation results in a considerably shortened brake path, the driver is deprived of the control of the braking operation in that a once initiated full braking proceeds entirely automatically, in other words the driver is no longer in a position to intervene in the braking operation. It is however desirable to stop full braking or emergency braking operations by an intervention on the part of the driver, for instance when the danger does not exist anymore.

DE-OS 39 02 215 discloses a vacuum brake booster in which a contact switch is provided in the region of movement of the valve piston in the control valve housing. The first contact of the contact switch is a metallic ring seated in a recess in the control valve housing. The second contact of the contact switch is the valve piston itself, in which an axially slidable metallic contact member is guided in a guide sleeve of insulating material which is arranged in a ring, and is biased by means of a pressure spring and establishes an electrical connection between the ring and the valve piston. A valve is connected to two contact elements provided in the control valve housing, in which the contact element cooperating with the valve piston is biased against the valve piston by means of a pressure spring. The pressure spring is always loaded so that the connection between the operating chamber of the brake booster and the source of vacuum is free. Upon actuation, the valve member becomes detached from the ring such that the power supply to the valve and consequently also the connection between the operating chamber and the source of vacuum is interrupted.

EP 0 327 276 specifies a brake booster in which a switch device is disposed besides a valve element for actuating brake warning lights, and an abutment element is carried by the valve element, said switch device being actuated in response to a movement of the abutment element with the valve element. The assembly containing the switch device is fixed to a housing of the brake booster which contains the servo piston.

DE 33 46 140 describes a vacuum brake booster in which a piston rod operable by a brake pedal is connected to a control valve piston which, via a reaction disk, acts on a pressure rod that is connected to the master cylinder. The reaction disk is received in a stepped bore and the free end of the control valve piston is provided with a pedal received in a stepped portion which limits the axial movability of the control valve piston.

EP 0 379 329 discloses a brake booster in which a switch having two touch contacts is provided in the housing of the brake booster. An actuating member axially displaced by a brake pedal includes a laterally protruding bar which is adapted to bridge the two contacts and thus close a circuit.

Based on the above, the problem underlying the present invention is to provide an apparatus by which a driver-initiated sudden stopping of an emergency braking operation is determined safely and free of interferences.

For solving said problem, the afore named apparatus has been further developed by the features of the characterizing portion of claim 1.

It is achieved with this construction that the switch means is actuated only by the driver's withdrawing the brake pedal in such a manner that a signal is generated which is supplied to the electronic control means of the vehicle brake system to take back again the maximum level control of the brake amplification (as it is taught in the above cited prior art).

In the placement of the switch means one has to take care that the latter delivers the afore-mentioned signal for taking back the maximum amplification only when the driver relieves pressure from the brake pedal in the process of emergency or full braking, in other words when he withdraws his foot to an extent that the brake pedal is released. In that case, the signal generated by the switch means causes the maximum brake boosting to become terminated again and the normal brake amplifier response curve is resumed.

A preferred embodiment of the afore described vehicle brake system leads to a second variant of the invention in which the safety of the vehicle brake system is improved as regards the monitoring of the named switch means. According to the second variant, the switch means is monitored as to its function.

The subject matter of said further development of the invention is a vehicle brake system including an electronically controlled brake booster which comprises an actuator which upon actuating a brake pedal triggers a brake boosting operation by means of the brake booster, and which, upon releasing the brake pedal after a braking operation, brings an electric switch into a first condition in which it supplies a signal to the electronic control means of the brake booster to reduce or terminate a brake boosting operation, wherein the switch is brought to a second condition when the brake is actuated in which it does not supply a signal for terminating the brake boosting operation and in which its function is monitored. It is important that upon brake actuation the switch changes its switch condition.

According to a preferred embodiment of said vehicle brake system it is provided that the switch comprises a movable part adjusting the two conditions which is moved both by a structural member being stationary with respect to a housing of the brake booster and a structural member being movable with respect to the housing of the brake booster.

A still further embodiment of the afore described vehicle brake system leads to an arrangement in which a sudden termination or deactivation of the emergency braking amplification is possible, and, at the same time, the protection against errors is augmented, mounting and checking are facilitated, and a switch actuation is warranted that follows the movement of the brake booster membrane as precisely as possible.

For solving the said problem, the vehicle brake system is provided with a first actuator which is connected to a second actuator to transmit to the latter an actuating movement of a brake pedal, the second actuator transmitting the movement to a master brake cylinder, a signal generation means disposed in the region connecting the first and the second actuators for generating a signal to be supplied to the control means of the brake booster, and a trigger area cooperating with the switch means and acting on the switch means following an actuating movement of the brake pedal, said trigger area being provided on a carrier that is displaceable in the direction of the actuating movement by a path or distance S which is greater than the stroke of the actuating movment required for actuating the switch means.

The advantage of said setup is that there is a rigid relation between the movement of the actuator and the actuation of the signal generating means which warrants certainty of signalling upon a sudden termination of the emergency braking operation. It is moreover possible to partly pre-assemble the signal generating means and its associated elements and to check it as to its proper functioning before the whole assembly is mounted; another check of the final, assembled condition is thus no longer absolutely necessary. Besides, the signal generating means may readily be replaced; an additional stop light switch is not required.

Further characteristics and advantages entailed by the invention will be described in greater detail in the following description of embodiments of the invention, with reference to the enclosed drawings.

FIG. 1 is a general view of a brake booster of a vehicle brake system which is provided with a switch means according to the invention.

Figure 1:
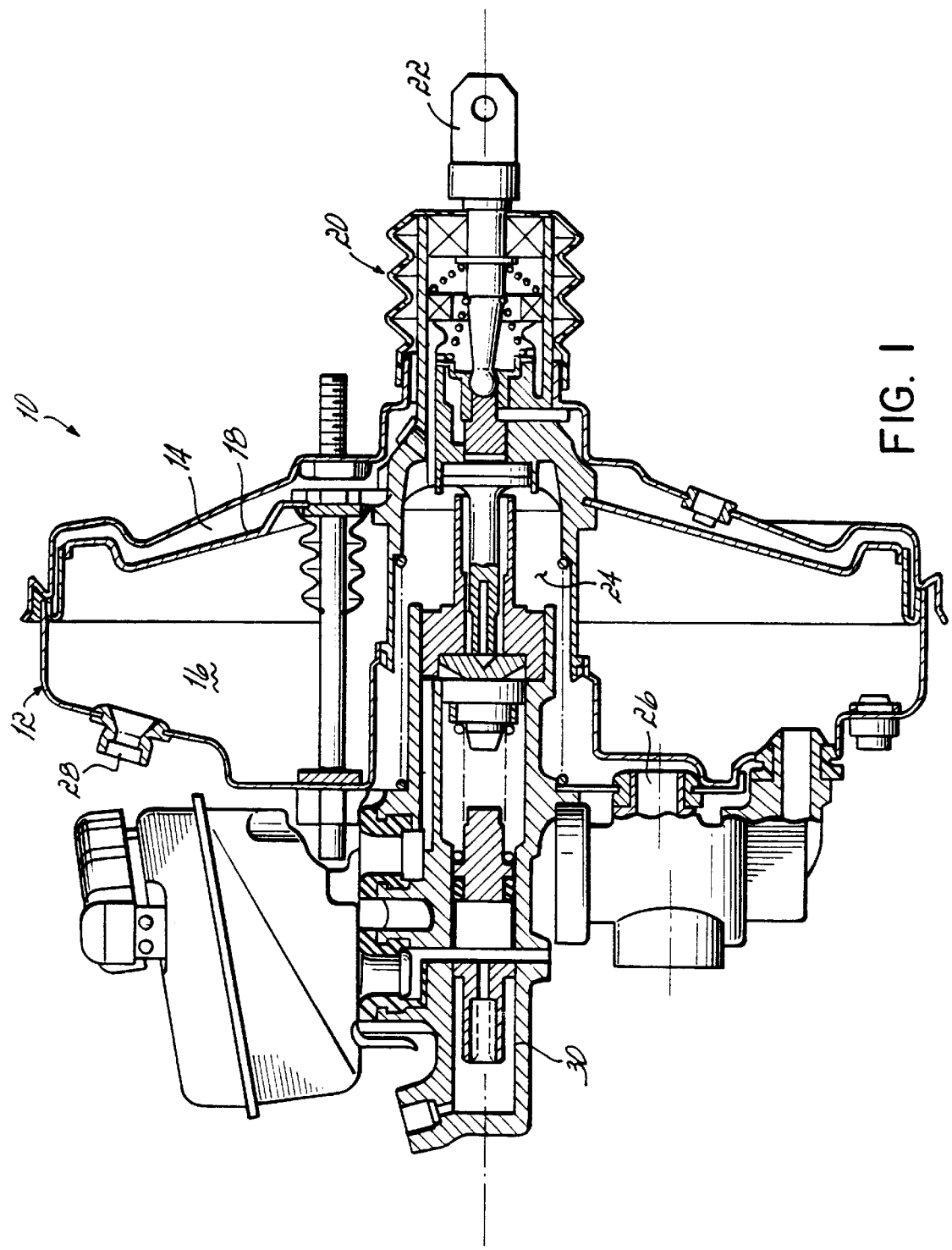
FIG. 1 shows a brake booster in a schematic sectional view.

The illustrated brake booster 10 has a substantially rotation-symmetrical housing 12 with a rear chamber 14 and a front chamber 16 which a separated by a movable partition 18. The brake booster includes a first controllable valve 20 which is connected to movable partition 18 for joint relative movement with respect to housing 12. The front end of a rod-shaped actuator 22 acts on valve 20, which, in the built-in or assembled condition, is connected to a brake pedal (not illustrated) of the motor vehicle.

Rear chamber 14 is connected to a defined central space 24 of the brake booster 10 by a check valve in such a way that air from said space 24 can flow into rear chamber 14, but cannot return. Central space 24 also communicates with a port 26 in housing 12 so as to admit air. Another port 28 in housing 12 for sucking off air is assigned to front chamber 16.

A power output member 30 is provided in central space 24 of the brake booster and rests against controllable valve 20. Power output member 30 is provided to actuate a master brake cylinder (not illustrated).

In the inoperative condition illustrated, with the low-pressure or vacuum source switched off, atmospheric pressure prevails in both chambers 14 and 16. Vacuum builds up in front chamber 16 when the vacuum source is switched on, for instance, during running of the engine with whose intake pipe the vacuum port 28 communicates so that the movable partition 18 is shifted slightly forwardly, accompanied by movement of valve 20, whereby the pressure once again becomes balanced between the two chambers 14 and 16. This position of readiness makes sure that from here on the brake pressure booster can be actuated without a loss distance.

The brake booster operates in the usual manner when the brake is normally actuated by the driver and the connection between the two chambers 14 and 16 is interrupted via controllable valve 20 and ambient air flows into rear chamber 14. As a consequence, an actuating force amplified by the brake booster is available at power output member 30. This is true also in a case where vacuum continues to prevail in central space 24—as it does in front chamber 16.

Figure 2:
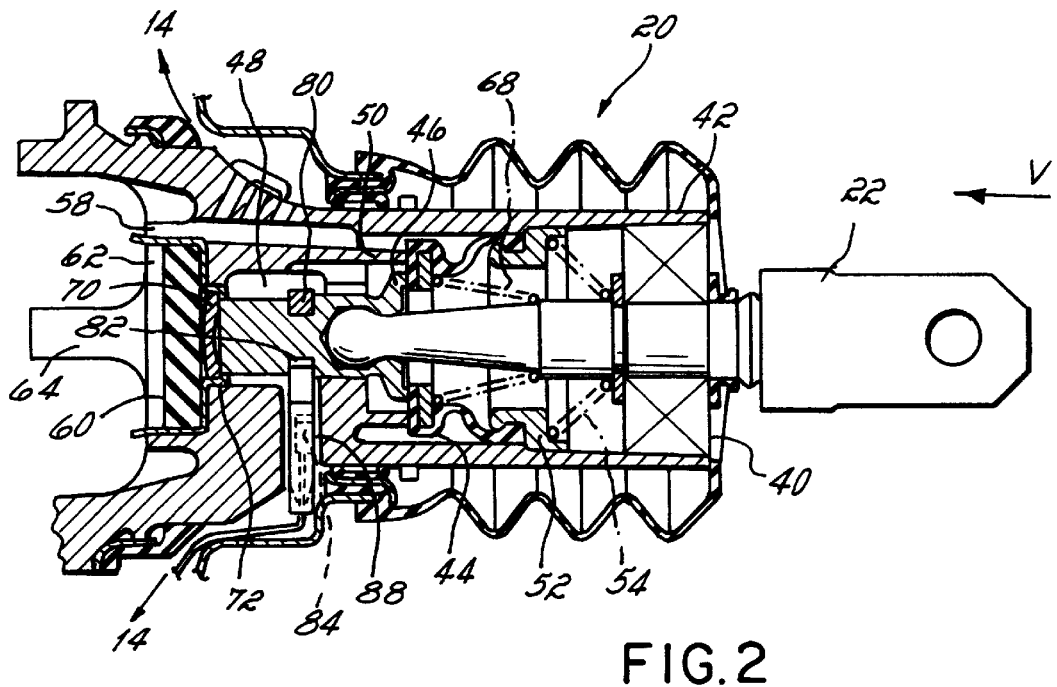
FIG. 2 shows a controllable valve of the brake booster according to FIG.1 of a first embodiment in an enlarged schematic sectional view.

FIG. 2 illustrates control valve 20 in more detail. Actuator 22 projects through an air-permeable cylindrical filter 40 into a control housing 40 which is rigidly connected to movable partition 18 and is adapted for axial displacement in housing 12. Actuator 22 carries a valve closure member 44 at its end being positioned in the interior of control housing 42, said valve closure member 44 being adapted to engage an inner valve seat 46 on a valve piston 48, as well as an outer valve seat 50 which is formed at the inner side of control housing 42. Valve piston 48 is positively connected to the free end of actuator 22. Valve closure member 44 is via a pretension sleeve 52 pressed against the inner valve seat 46 by means of a compression spring 54 which rests against actuator 22. Rear chamber 14 is sealed against front chamber 16, as a passage 58 has been locked.

Via a resilient member 60 received in a recess at the front end of the valve housing 42 as well as a compression rod 64 having a head flange portion 62, a forward movement in the direction of arrow V of actuator 22 is transmitted to an actuating piston of a master brake cylinder, not illustrated, of a brake system which is mounted to the end of the brake booster disposed at the side of the vacuum.

A second compression spring 68 which is arranged intermediate actuator 22 and valve closure member 44 is responsible for a pretensioning of actuator 22, or its inner valve seat 46, vis-à-vis valve closure member 44.

A sensor disk 70 is provided between valve piston 48 and the resilient disk-shaped member 60 which acts in the manner of an incompressible fluid, the axial movability of said disk 70 being limited by resilient member 60, on the one hand, and by a collar 72 acting as abutment, on the other hand, through which collar the actuator 22 extends and acts on sensor disk 70.

Figure 5:
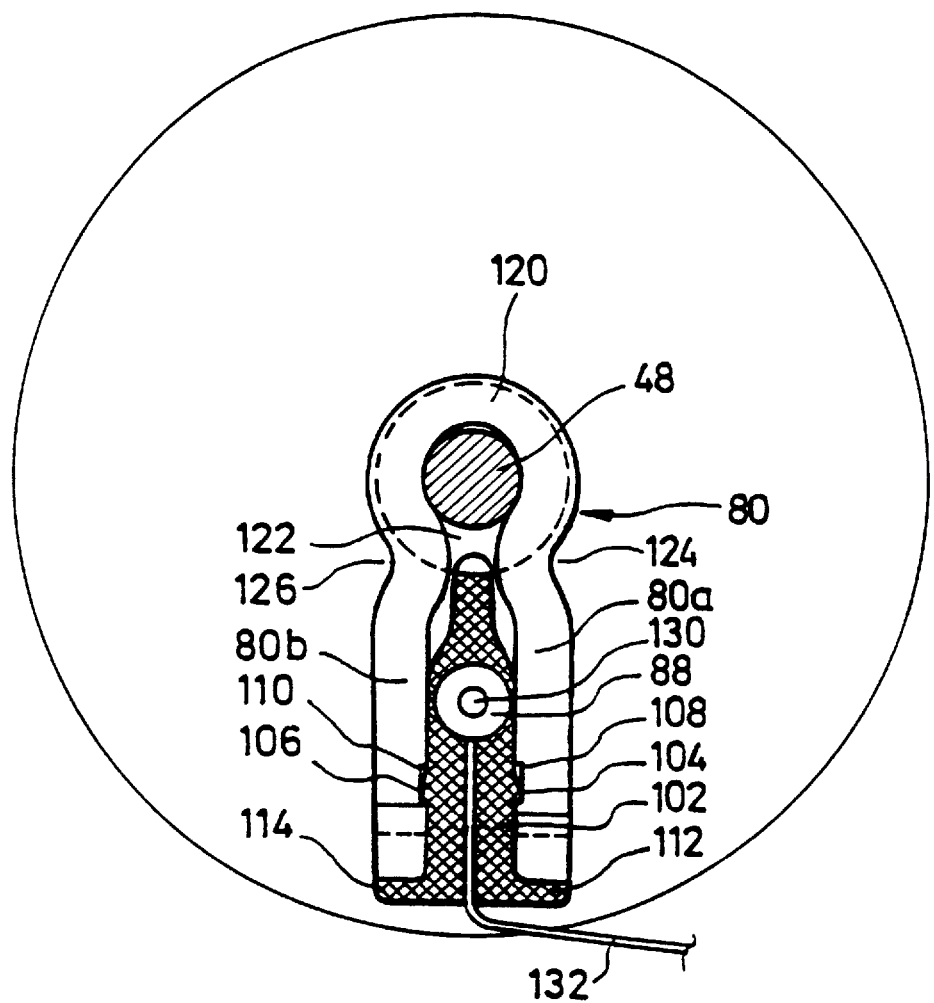
FIG. 5 shows a schematic view of a cross section along line V—V in FIG. 4 through the actuator with path limiting element.

The axial movability of valve piston 48—and hence also that of actuator 22 which is connected to the valve piston 48—is limited by a path limiting element 80 that is positively fitted in an annular groove 82 formed in valve piston 48. Path limiting element 80 has the configuration of a substantially U-shaped clamp whose legs are in the center region angled whith the bent portions facing each other, so that valve piston 48 is securely enclosed by said legs. Path limiting element 80 extends into a channel 84 leading to rear chamber 14. A switch means 88 is disposed intermediate the two legs 80a, 80b (cf. FIG. 5). The walls of channel 84 are formed as abutment surfaces 90, 92 between which path limiting element 80 is reciprocable in axial direction.

Figure 4:
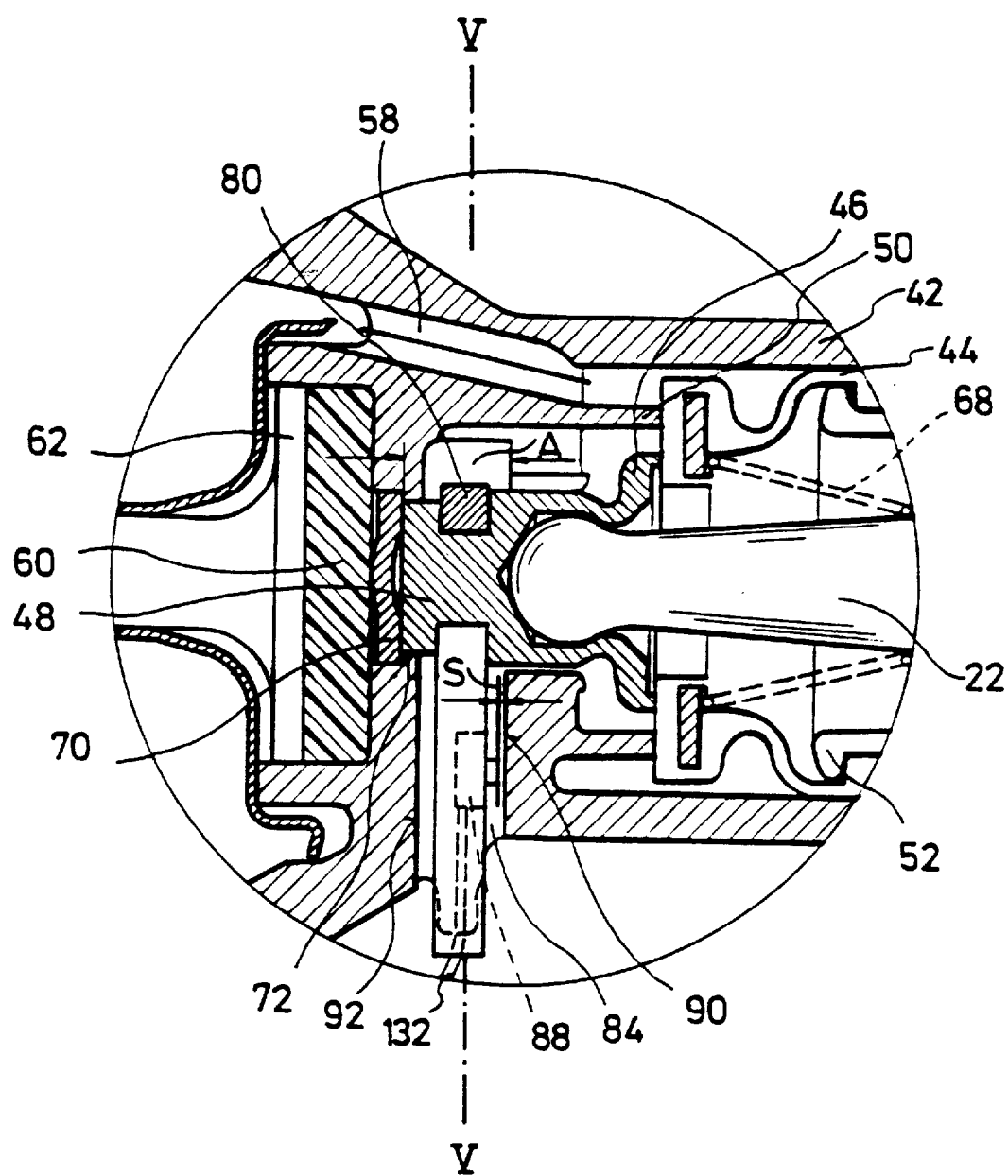
FIG. 4 shows a section of the valve according to FIG.2 in another enlarged schematic sectional view.

FIG. 4 illustrates in detail that distance A between collar 72 acting as abutment and abutment surface 90, at which switch means 88 can be actuated with the cooperation of path limiting element 80, is dimensioned such that when disk 70 rests against collar 72, path limiting element 80, or switch means 88 received in it, is still a path or distance S away from abutment surface 90. It is thus guaranteed that for actuating switch means 88, path limiting element 80 still has to cover the path or distance S in the direction of abutment surface 90.

Path or distance S is dimensioned such that an erroneous actuation of switch means 88 which, for instance, may occur due to a resetting by hydraulic forces of actuator 64, or disk 70, in an ABS mode of operation is excluded.

As will be explained in more detail in connection with the mode of operation hereinafter, control valve housing 42 is displaceable vis-à-vis housing 12 of the remaining brake booster, in a direction coaxially to actuator 22.

From this fact, another rule for dimensioning path or distance S results. Path or distance S is to be dimensioned such that an erroneous actuation of switch means 88 which may occur due to pressure impacts which are caused by the ABS mode of operation is excluded and which are directed in the opposite direction of the force exerted by the brake pedal and result in a relative movement between path limiting element 80 assigned to actuator 22 and abutment 90 which, together with path limiting element 80 causes an actuation of switch means 88.

The switch means as such may have the most different configurations. It has to be kept in mind that a short but defined switch path is important so that path or distance S is not changed by the respective switch means 88 used, or else the length of the actuation path in the interior of switch means 88 has to be added when dimensioning path or distance S.

Switch means 88 is received intermediate legs 80a and 80b of path limiting element 80, said switch means 88 being mounted in a shaped body 102 which is latched in accordingly shaped recesses 108 and 110 in legs 80a and 80b by means of two lateral latch lugs 104 and 106. Shaped body 102 is substantially T-shaped, the two laterally protruding projections 112 and 114 resting on the free ends of legs 80a and 80b such that the longitudinal movability of shaped body 102 by the two projections 112 and 114 together with the latch lugs 104, 105 is limited.

In the embracement region 120 of valve piston 48 by path limiting element 80, said valve piston is embraced about 340°, a small gap 122 remaining between legs 80a and 80b of path limiting element 80 through which said element 80 is shifted into groove 82 in valve piston 48. Both legs 80a and 80b have two angled sections 124, 126 by which the substantial embracement of valve piston 48 is achieved.

In the following, the function of the brake booster is explained in connection with path limiting element 80 and the different switch conditions of switch means 88, respectively.

In an initial position, the brake booster assumes the position illustrated in FIG. 1. Path limiting element 80 or switch means 88 received therein rests against abutment surface 90 whereby the final position of valve piston 48 coupled to actuator 22 and of valve closure member 44 is defined. Control valve housing 42 is pressed against path limiting element 80 by a spring (not illustrated) which is provided in the interior of brake booster housing 12, with the result that control valve 10 is opened and airing (rear) chamber 14 is connected to the atmosphere.

If, following starting of the vehicle engine, a vacuum is applied to front chamber 16, a pressure difference is established between either sides of movable partition 18. Due to said pressure difference, partition 18, together with control valve housing 42, moves in the direction of front chamber 16 until inner valve seat 46 becomes just closed by valve closure member 44. The brake booster remains in said position for as long as the pressure difference and the respective resetting forces of springs 54, 68 are balanced. Actuating the brake pedal and the ensuing shifting of actuator 22 result in a direct amplification of the brake force.

In the second functional position (partly loaded position), the brake booster supplies only part of its possible energy. This takes place during a normal braking operation. Inner valve seat 46 and outer valve seat 50 are then closed by valve closure member 44, and control member housing 42 is in the position in which it is shifted in the direction of front chamber 16, respectively.

The position of path limiting element 80 with respect to control valve housing 42 is the same both in the position of readiness and in the partly loaded position, in other words, a defined path or distance S is left free between path limiting element 80 and control valve housing 42, and abutment 90, respectively, the effect being that switch means 88 is in its non-actuated position.

Upon full braking, inner valve seat 46 is shifted with respect to valve closure member 44 in the direction of front pressure chamber 16 to an extent that atmospheric air is free to flow through filter 40 to rear chamber 14; the maximum possible pressure difference thus prevails in the booster system. Disk 70 is then urged into resilient element 60 by actuator 22. In said position, path limiting element 80 is in the proximitiy of, or in engagement with, abutment surface 92. The distance between switch means 88 and abutment 90 is the largest one in said condition so that switch means 88 is likewise non-actuated and no signal is supplied to the control means.

If the driver wants to abruptly stop the full braking operation, the brake pedal has to be released to this end almost completely so that resetting springs 54, 68 shift actuator 22 back in opposite direction to the direction of arrow V (FIG. 2), in which valve closure member 44 also moves away from outer valve seat 50. A pressure balance is thus established through passage 58 and channel 84 between front and rear chambers 16, 14.

Path limiting element 80, or switch means 88 disposed therein, rests against abutment 90 in said position so that an actuation of switch means 88 is effected whereby a signal is supplied to the control means. From the afore statements it is clear that to each functional position of the brake booster a defined position of path limiting element 80, or its switch means 88, can be assigned which results from the relative movement between control valve housing 42 and actuator 22, or the elements assigned to the latter.

Figure 3:
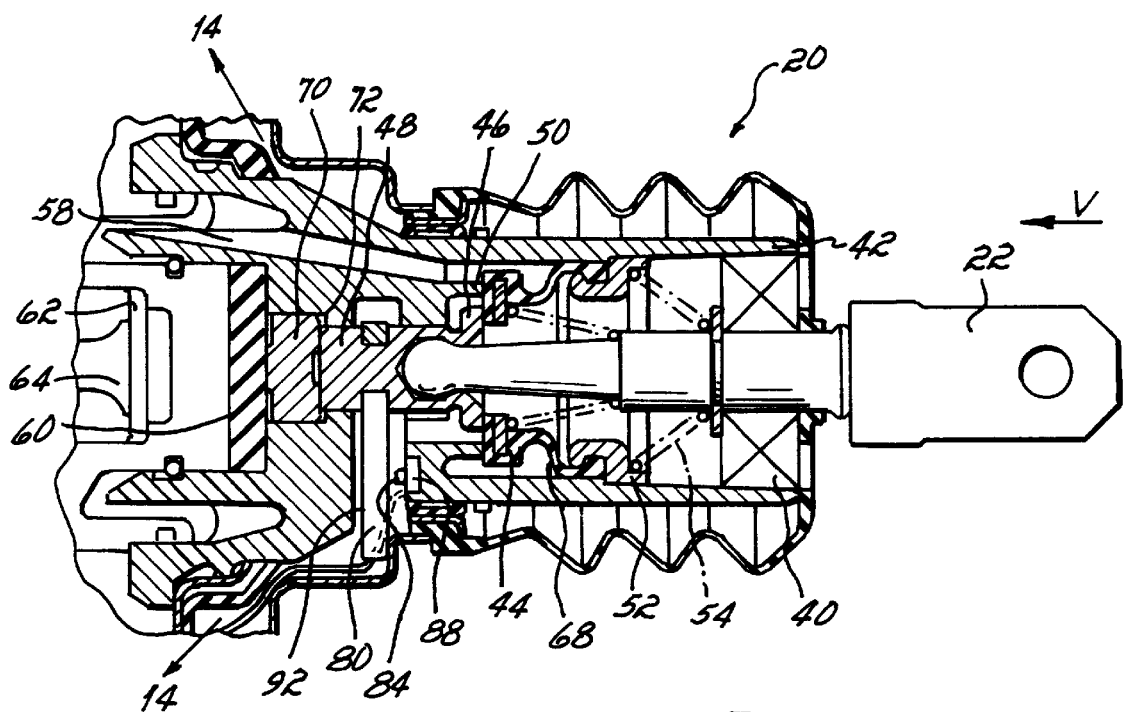
FIG. 3 shows a controllable valve of a brake booster according to FIG. 1 of a second embodiment in an enlarged schematic sectional view.

Switch means 88 may also be fitted into abutment surface 90 and actuated by path limiting element 80 (FIG. 3). A particularly simple embodiment is obtained when shaped body 102 (cf. FIG. 5) is made of insulating material and switch means 88 merely has a contact button 130 which, when abutment 90 is touched, establishes an electrical connection with the same.

A signal is supplied to the brake control means by an electrical connecting cable 132 which is is interpreted such that the brake booster rapidly falls back, or is rest to, its amplification characteristic. In this manner a driver-initiated full braking operation is abruptly stopped.

The dimensioning of distance A or path S in consideration of the vibrations that occur in each case, or pressure variations during the control of the ABS mode of operation effectively prevents erroneous initiations, in other words, abrupt stopping of full braking operations which are not intended by the driver.

Figure 6:
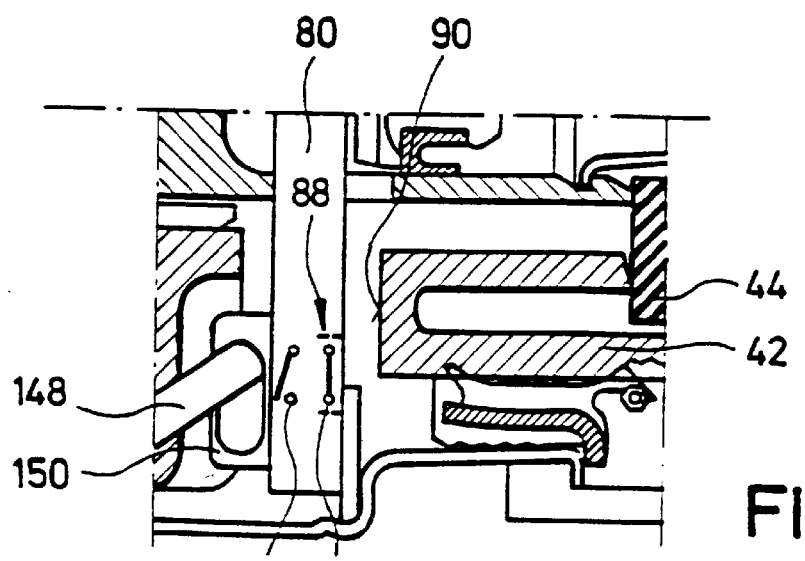
FIGS. 6 to 8 show details of a brake system of another embodiment having a brake booster that is modified visa-vis FIGS. 1 to 5, in which the function of the switch means is monitored.
Figure 7:
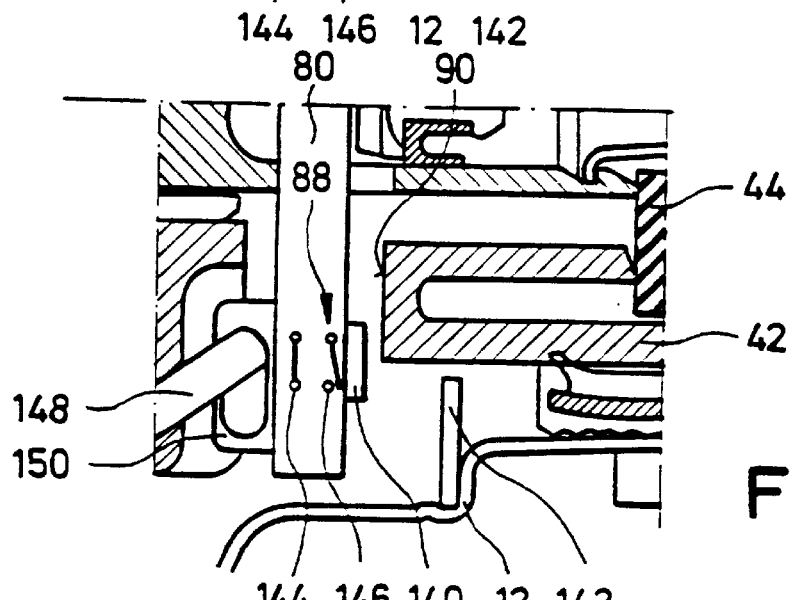
Figure 8:
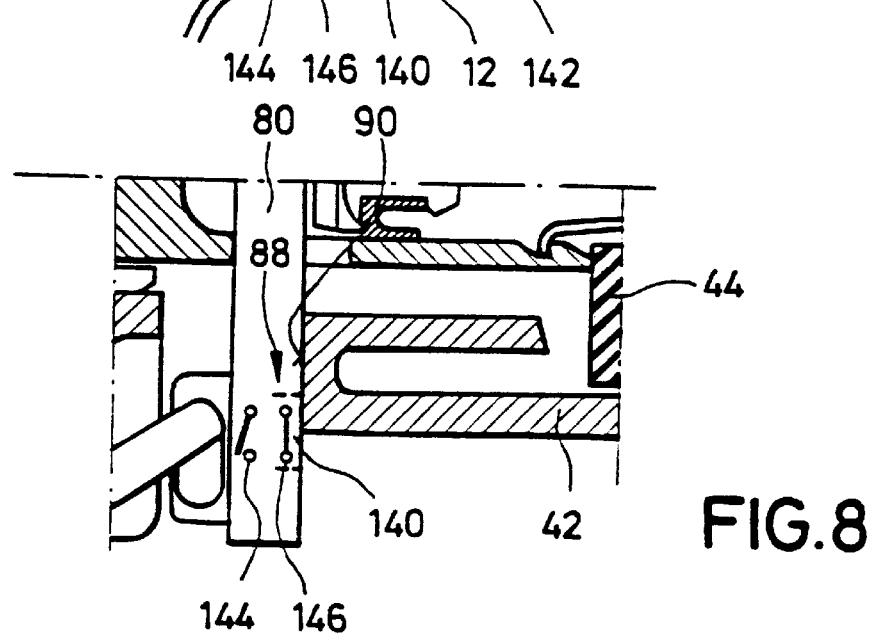

FIGS. 6, 7 and 8 show modifications of the afore described brake booster, in which only the modified elements are illustrated in FIGS. 6, 7 and 8, while the remaining elements and conditions correspond to those of exemplified embodiment according to FIGS. 1 to 5.

In the exemplified embodiment according to FIGS. 6 to 8, the operability of switch means 88 is monitored. It is taken into account that switch means 88 is used relatively seldomly in the exemplified embodiment according to FIGS. 1 to 5. If a so-called emergency braking does occur wherein the pedal is pressed down extremely firmly and the driver abruptly stops the emergency braking operation by releasing the brake pedal, it is possible that a non-functioning switch means 88 has negative effects. This is prevented in the modification of the brake system according to FIGS. 6, 7 and 8. If it is found in the check of the operability of switch means 88 that the latter does not function, the electronic control of the brake booster gives consideration to said fact in that, upon failure of switch means 88, no particular maximum brake amplification is provided anymore, also not in the case of a so-called emergency or full braking operation. It is of course possible to detect a malfunctioning of switch means 88 in the usual manner during the electronic check of the vehicle and to display it at any suitable place (at the dashboard or the like).

As shown in FIGS. 6, 7 and 8, switch means 88 (as above) is mounted to path limiting element 80 (which is termed also cross bracket) in order to be able to test the operability of switch means 88. Switch means 88 includes a movable part 140 shich is shaped as a tappet and movable axially (perpendicularly with respect to the longitudinal extension of path limiting element 80).

An abutment 142 is stationarily mounted to housing 12 of the brake booster for checking switch means 88. In certain operating conditions of the brake, said abutment cooperates with movable part 140 of switch means 88. In FIGS. 6, 7 and 8 different operational conditions of the brake system are illustrated.

In FIG. 6, the brake system is illustrated in its inoperative condition. As stated hereinabove, actuator 22 (not illustrated in FIGS. 6 to 8), and along with it path limiting element 80, is in said condition urged to the right in the figures. In this position, path limiting element 80 abuts abutment 142, and movable part 140 of switch means 88 is pressed into an assigned recess in path limiting element 80, which is illustrated in FIG. 6 by broken lines. Switch means 88 comprises two contacts 144, 146. According to FIG. 6, movable part 140 having been pressed into path limiting element 80 (cf. FIG. 7) acts in such a manner that the one switch contact 144 is opened, while the other switch contact is closed. Checking the operability of switch means 88 can thus be performed already in the inoperative condition of the brake.

FIG. 7 shows the condition of a so-called normal braking operation (in other words no emergency or full braking with maximum braking amplification). From the above description based on FIGS. 1 to 5 it results that a braking operation causes that path limiting element 80, as well as control housing 42, are moved in forward direction, which is to the left in the figures. This movement is effected relatively with respect to housing 12 of the brake booster. Hence, in a braking operation, the path limiting element 80, and consequently also movable part 140 of switch means 88, become detached from abutment 142 so that according to FIG. 7, movable part 140 is moved out of path limiting element 80 due to the tension of a spring (the spring is not shown). According to FIG. 7, the one switch contact 144 of switch means 88 is closed in said condition, while the other switch contact 146 is open. In such a braking operation, the condition of switch contacts 144, 146 is sensed by the electronic control of the brake booster which can thus check the operability of switch means 88.

FIG. 8 illustrates an abrupt stopping of an emergency or full braking operation, which is of particular interest. From the above description of the brake booster it results that when such stopping of the braking operation is effected, control housing 42 (connected to movable partition 18) remains in the advanced position for a certain period of time still (displaced to the left in the figures), while actuator 22 along with path limiting element 8o is urged into the rear position (to the right in the figures), in response to the spring forces. As described above with the aid of FIGS. 1 to 5, movable part 140 of switch means 88 engages then abutment 90 which is fixedly connected to control housing 42. The electronic control "knows" that previously a brake amplification was carried out at maximum level and interprets the signal of switch means 88 being in the position illustrated in FIG. 8 such that the electronic control of the brake booster is changed from maximum brake amplification (emergency or full braking) to assume the normal brake amplifier response curve.

Depending on the functional condition of the brake system, movable part 140 of switch means 88 is therefore actuated by two elements, by abutment 142, on the one hand, which is stationary with respect to the brake booster, and on the other hand by abutment 90 which is movable with respect to the brake booster and coupled to control housing 42. To this end, the face end of movable part 140 is positioned such that its upper half is gripped by abutment 90, while its lower half is gripped by abutment 142.

Each operation of the brake entails an actuation of switch means 88 so that its operability can continuously be monitored. In a first condition (FIG. 8) switch means 88 supplies a signal to the electronic control of the brake booster for reducing or stopping the maximal brake amplification. In a second condition (FIG. 7), switch means 88 does not supply a signal for stopping the maximal brake amplification, but it is still switched on, to monitor its function.

Figure 9:
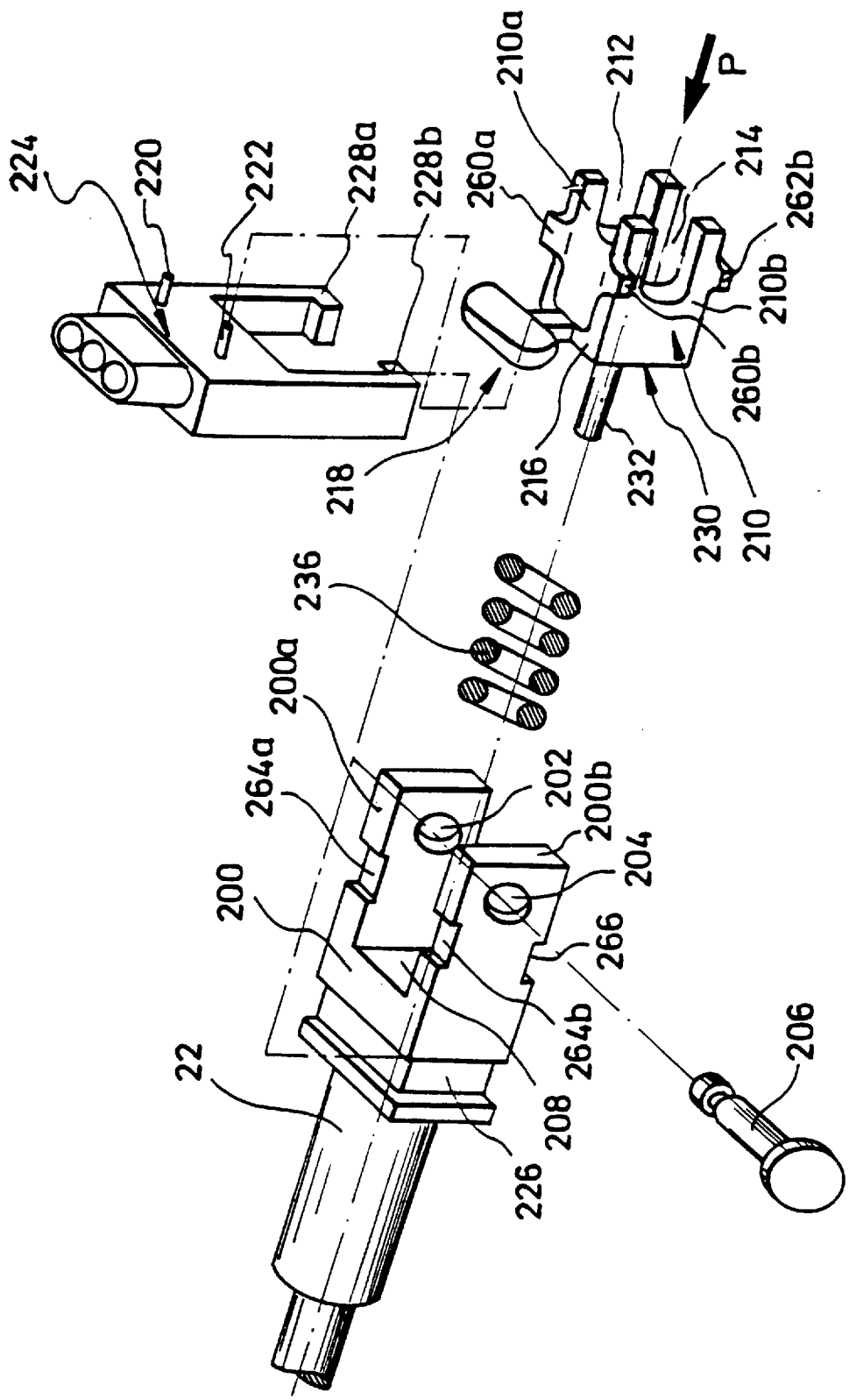
FIG. 9 shows another embodiment of a part of a vehicle brake system according to the invention in a perspective exploded view.

FIG. 9 illustrates the front end of the rod-shaped actuator 22 having a forked joint connection 200 integrally formed at its free end. One passage 202, 204 is formed in each leg 200a, 200b of fork joint 200 through which a transverse bolt 206 may be passed. A free space 208 is provided between the two legs 200a, 200b of fork joint 200 into which a contoured, U-shaped carrier 210 may be introduced.

Carrier 210 which is bent or punched from sheet material comprises two legs 210a, 210b, each of which having at its free end an open elongate recess 212, 214 in alignment with the passages 202,204 or the transverse bolt 206. A release surface 218 is integral with carrier 210 and extends laterally upwardly in the region of its transverse leg 216, said release surface 218 being dimensioned such that it projects laterally beyond the fork joint head200 and is adapted to act simultaneously on two actuating pins 220, 222 of a signal generation means 224 constituted by two micro switches when carrier 210 is moved in the direction of arrow P in response to an actuation movement of the brake pedal.

Signal generation means 224 is a substantially a U-shaped member of plastic material which contains the two micro switches in its transverse web and is received in a groove 226 of the fork joint head 200 transversely to the direction of movement of the actuator 22. Signal generation means 224 is made of an elastic material allowing to bend apart the two legs of the signal generation means to an extent that latch lugs 228a, 228b provided at each of the ends of the legs embrace groove 226 and safely and lastingly fix signal generation means 224 to fork joint head 200.

Figure 10:
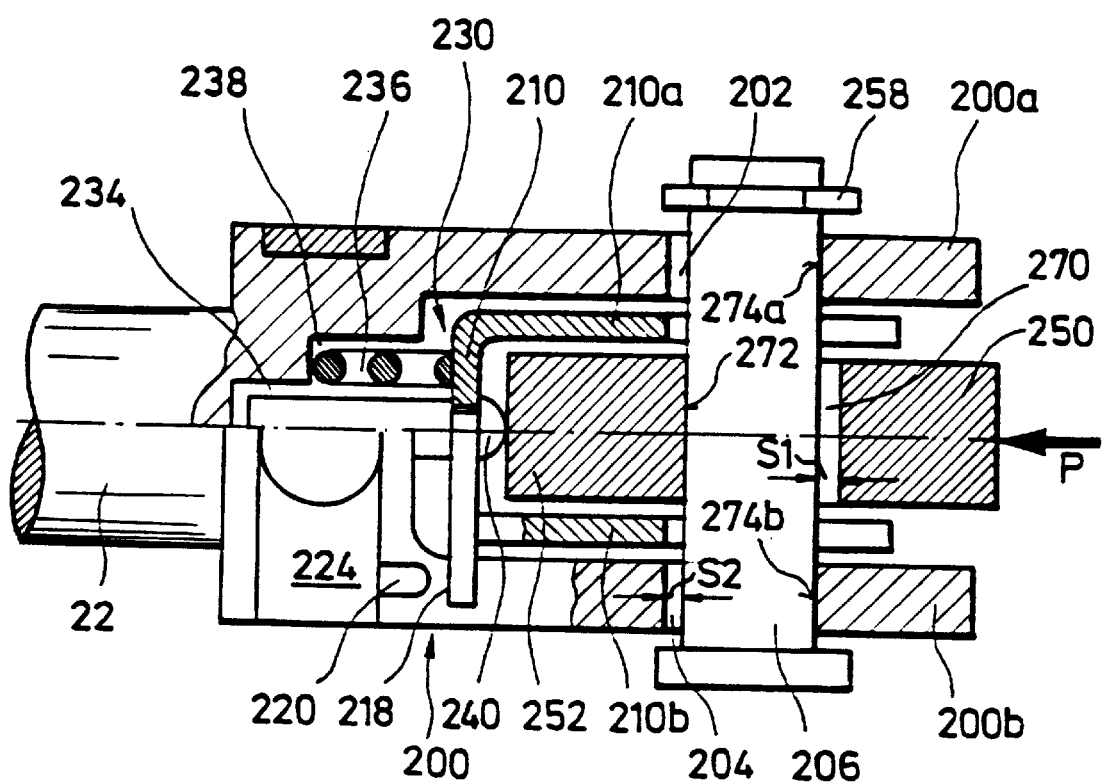
FIG. 10 shows an assembly according to FIG.9 in a partly sectional side view.

Carrier 210 is provided at its end face 230 facing fork joint head 200, with a centrally disposed guide pin 223 which is received with play in a stepped bore 234 (cf. FIG. 10) in fork joint head 200. Guide pin 232 is surrounded by a helical spring 236 which is supported at a step 238 on the stepped bore 234 and rests with its other end on end face 230 of carrier 210. Guide pin 232 is designed as a rivet bolt whose rivet head 240 extends into the space between the two legs 210a, 210b of carrier 210.

In the assembled condition, a first actuator 250 transmitting an actuation movement of a brake pedal (not illustrated) in the direction of arrow P, is received between legs 210a, 210b of carrier 210 as well as between legs 200a, 200b of fork joint head 200 in such a way that the free end face 252 of the first actuator rests against rivet head 240. Helical spring 236 is responsible for a resilient and snug abutting of rivet head 240 against end face 252 of first actuator 250.

Transverse bolt 206 extends through the two legs 200a, 200b of fork joint head 200, legs 210a, 210b of the carrier, and first actuator 250. A safety ring 258 at transverse bolt 206 effects a non-losable connection between the first actuator 250 and fork head 200 of the second actuator 220 as well as carrier 210 received between the same.

Carrier 210 has transversely protruding guide or stop brackets 260a, 260b, 262a, 262b provided, in each case, at the sides of the two legs 210a, 210b, which engage corresponding guide grooves 264a, 264b, 266a, 266b at the sides of legs 200a, 200b and guarantee a coaxial guiding of carrier 210 in fork joint head 200 and, in the pre-assembled condition of the actuator system, prevent the carrier from falling out —when transverse bolt 206 is missing —and still allow axial movabiltiy and thus safe actuation of signal generation means 224. In the built-in or assembled condition, guide pin 232 in stepped bore 234 takes over the axial guiding of carrier 210 in fork joint head 200, and transverse bolt 206 limits the axial movability of the individual elements with respect to each other in the manner described hereinafter.

In its released condition, the brake pedal is maintained in the release position by its return spring. Therefore, transverse bolt 206 situated in through bore 270 in the first actuator 250 abuts bore shoulder 272 (left in FIG. 10) which faces free end 252 of first actuator 250. The internal diameter of bore 270 is larger than the external diameter of transverse bolt 206 so that first actuator 250 can cover a blank path, or play, S1 whose length corresponds to the difference in the diameters of bore 270 and transverse bolt 206 before actuator 250 moves transverse bolt 206 in the direction of arrow P. Helical spring 236 urges carrier 210 and hence rivet head 240 opposite to the direction of arrow P (to the right), with the consequence that transverse bolt 206 is through bore shoulder 272 moved opposite to the arrow direction P until transverse bolt 206 gets in the region of the through opening 202, 204 in legs 200a, 200b of fork joint head 200 to rest against the respective right-hand bore shoulders 274a, 274b thereof. Since also the internal diameter of through openings 202, 204 is larger than the external diameter of transverse bolt 206, it is possible for the first actuator to become displaced by a blank path or distance S2 in the direction of arrow P, before a further actuation of first actuator 250 causes a displacement of fork joint head 200 and the connected second actuator 22.

Independent of the fact that the first actuator 250 has to cover a total blank path, or play, SL=S1+S2 before the actuation movement of the same in the direction of arrow P leads to a displacement of second actuator 22, the slightest displacement of first actuator 250 in the direction of arrow P via its end face 252 and rivet head 240 causes already a displacement of release surface 218 in the direction of actuating pins 220, 222 of signal generation means 224 since, due to the action of helical spring 236, carrier 210 rests resiliently against the end face 252 of the first actuator 250, via rivet head 240. In the same way, already upon a slight release of the brake pedal, the tension of helical spring 236 causes that carrier 210 having release surface 218 integrally formed thereon becomes detached from pins 220 of signal generation means 224 so that a respective signal is supplied to the control electronics of the brake booster.

Since the signal generation means 224 comprises two control elements —which by the way may be non-impact contacts, for instance, Hall elements—a redundant, and hence safe, signal generation as well as an electromechanical check of its function is possible.

With respect to return springs 54, 68 (cf. FIG. 2) of the brake booster, the spring force of helical spring 236 is dimensioned such that, in all cases, first helical spring 236 is compressed when the brake pedal is actuated in the direction of arrow P so that signal generation means 224 is actuated before a displacement of second actuator 22 takes place.

The afore-mentioned signal generation means provide a signal which is processed by the electronical control device to switch off the electronic control function when the brake pedal is released by the driver. If however, the signal generation means failes after the initiation of the electronically supported braking, a release of the brake pedal could not be sensed by the electronic control device. Consequently, the vehicle would be slowed down to a stand still. In order to avoid that such an undesired situation might occur, and to have a fail-safe, redundant system it is desirable to have the following (additional) generation means incorporated into the brake booster.

All these embodiments have in common, that they are able to sense a interruption of supported braking by providing a second signal generation means independent from the first signal generation means in case one of the two fails after the automatic (supported) braking has been initiated.

To achieve this, the coming into contact and the loosening of the contact between the disc 70 or the plate 374 and the pin 368 is sensed. This means that all following embodiments of the signal generation means can sense the coming into contact as well as the loosening of the contact and submit a corresponding signal to the electronic control device.

Figures 11, 12:
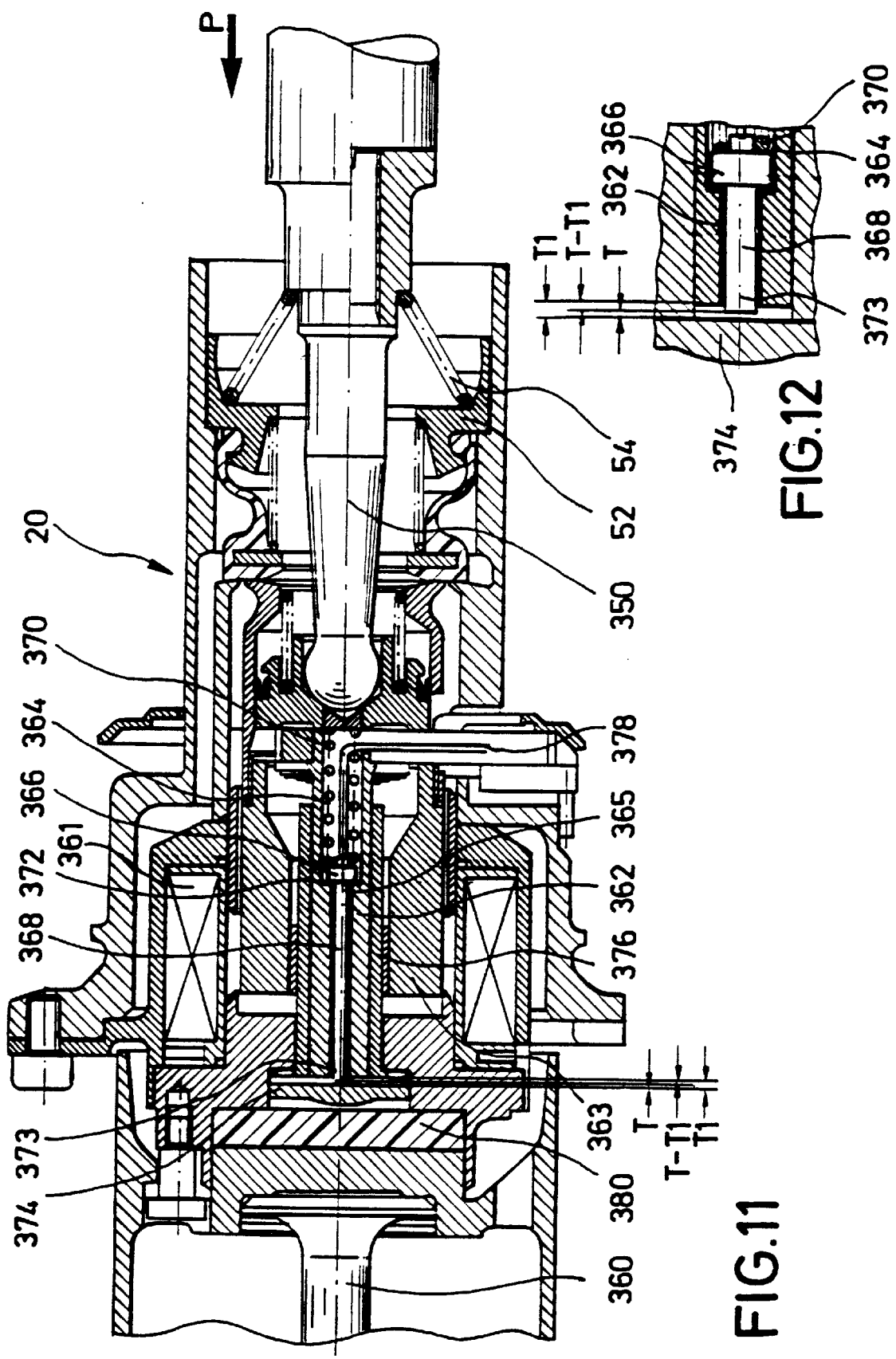
FIG. 11 shows a further embodiment of a control valve for a brake booster in a sectional view.
FIG. 12 shows a partial enlarged view of a switch means used in the embodiment of FIG. 11.

FIG. 11, 12 show the same part of a brake booster as FIG. 3. The main differences between the embodiment of FIG. 3 and the embodiment of FIG. 11, 12 are the electromagnetic actuation of the control valve 20 formed by a solenoid coil 361 and a plunger 363 and a signal generation means 365. The signal generation means 365 in FIG. 11, 12 is disposed between a first and a second actuator 350, 360 which transmit a actuating movement P of a brake pedal to a (non-illustrated) master brake cylinder. The valve piston 58 of FIG. 3 corresponds to a sleeve member 362 in FIG. 11. The sleeve member 362 comprises a stepped bore 364 which receives a head portion 365 of a contact member forming the signal generation means 365. A pin 368 of said contact member 365 extends through the sleeve 365. The head portion 366 of the contact member 365 is resiliently biased by a coil spring against a step 372 of the stepped bore 364. The free end of the pin 368 faces a plate 374 which corresponds to a disc 70 of FIG. 3. In an inoperative position of the brake booster, the fee end 373 has a predetermined distance T from the plate 374.

The sleeve 362 is received in a tube 376 so as to be axially slideable therein. The tube 376 extends the sleeve 362 at its end facing the plate 374 by a distance T1 in the inoperative position of the brake booster.

Upon an axial movement of the first actuator 350 by distance T1, the plate 374 contacts the end 373 of the pin 368 facing the plate 374. Consequently, the signal generation means 365 is triggered to provide a signal via the electrical wire 378 which is propagated to the (non-illustrated) electronical control device. A further axial movement of the actuator 350 by a distance T–T1 causes the sleeve 362 to contact the plate 374. Thereby, the plate 374 is urged against the second actuator 360 via a rubber element 380 which corresponds to element 60 of FIG. 3. In the fully actuated position, the pin 368 of the contact member 365 is completely withdrawn in the sleeve 362 and moved against the coil spring 370 towards the first actuator 350.

As can also be seen in FIG. 11, 12, the pin 368 of the contact member 365 is held within the stepped bore 364 by an electrically insulating ring 384 at the end of the sleeve 362 facing the plate 374. The head portion 366 of the contact member 365 is also made of a electrically insulating material. Thus the pin 368 can be held on a predefined electrical potential. Each time, when the free end of the pin 368 facing the plate 374 comes into electrical and/or mechanical contact with the plate 374 which is connected with the ground potential of the vehicle, this can be sensed. The signal SG generated thereby is used by the electronic control device (not shown).

Figures 13, 14:
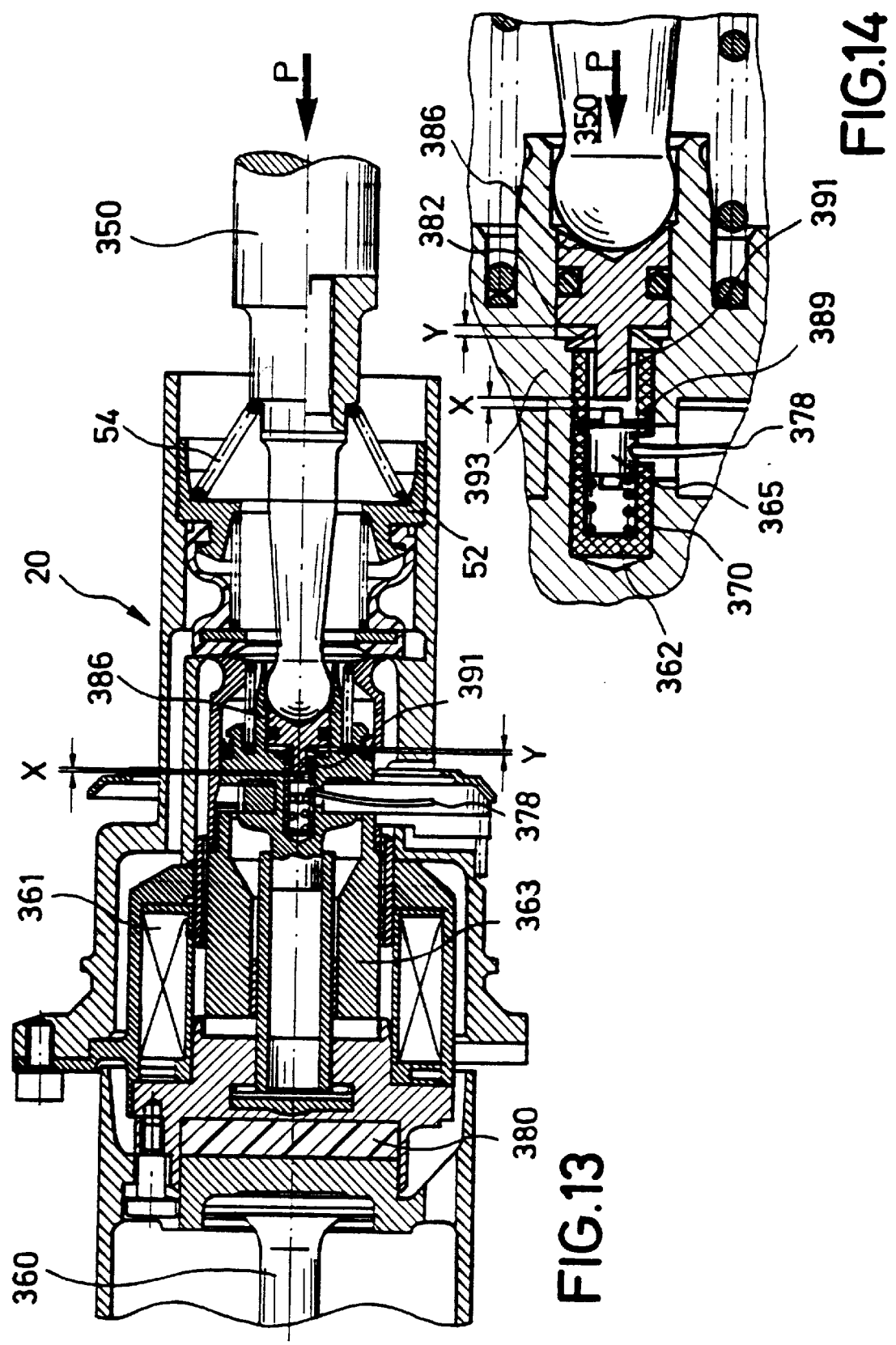
FIG. 13 shows a further embodiment of a control valve for a brake booster in a sectional view.
FIG. 14 shows a partial enlarged view of a switch means used in the embodiment of FIG. 13.

FIG. 13 and 14 show a further embodiment of the invention. Identical reference numerals as in FIG. 11, 12 are related to identical or similar parts. In this embodiment, the signal generation means 365 is received in a sleeve 362 in which a coil spring 370 urges the signal generation means against a ring 389 limiting the axial movement of the signal generation means 365 in a direction against the movement P of the actuator 350. In an inoperative position, the signal generation means 365 is held at a distance Y–X from an abutment 391 by a disc spring corresponding to disc spring arrangement 370. The abutment 391 is projecting through the disc spring 370 and is intregrally formed with the trigger member 386. Upon an axial movement of the first actuator 350 in the direction P, the first actuator 350 must cover the distance X before it causes a triggering of a signal by a signal generation means 365. As soon as the first actuator 350 has pushed the trigger member 386 by a total distance Y (Y>X) the flange of the trigger member has compressed the spring arrangement 382 and trigger member 386 abuts the sleeve 393.

Figure 15:
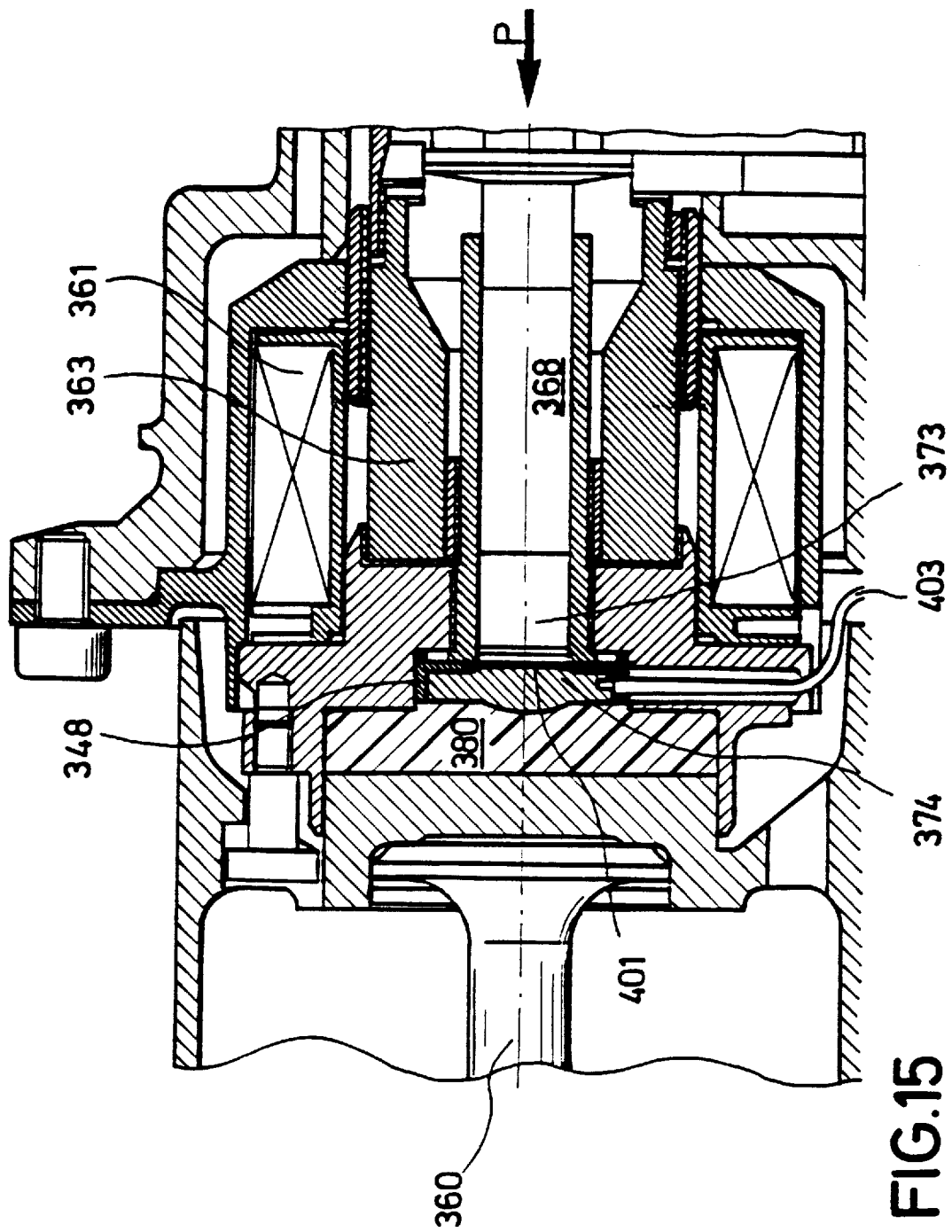
FIG. 15 shows a further embodiment of a control valve for a brake booster in an enlarged sectional view.

FIG. 15 shows a further embodiment of a control valve with a modified switch means. In this embodiment, the switch means is formed by the plate 374 which is mounted in a ring 389 which electrically insulates the plate 374 against the valve housing. The face 401 of the plate 374 oriented towards the free end 373 of the pin 368 can come into an electrical contact with the free end 373 of the pin 368 when the pin is moved into the direction P by an axial movement of the first actuator 350. Since the plate 374 is held by the electrically insulating rubber plate 380, the contact of the pin 368 with the plate 374 can be sensed through a wire 403 soldered or welded to the plate 374. Consequently, the potential of the pin 368 (usually ground potential) can be sensed by the electronic control device when contact between the pin 368 and the plate 374 is made.

The various embodiments of the switching means can be combined to have a redundant and hence more reliable sensing of the movement.

Figure 16:
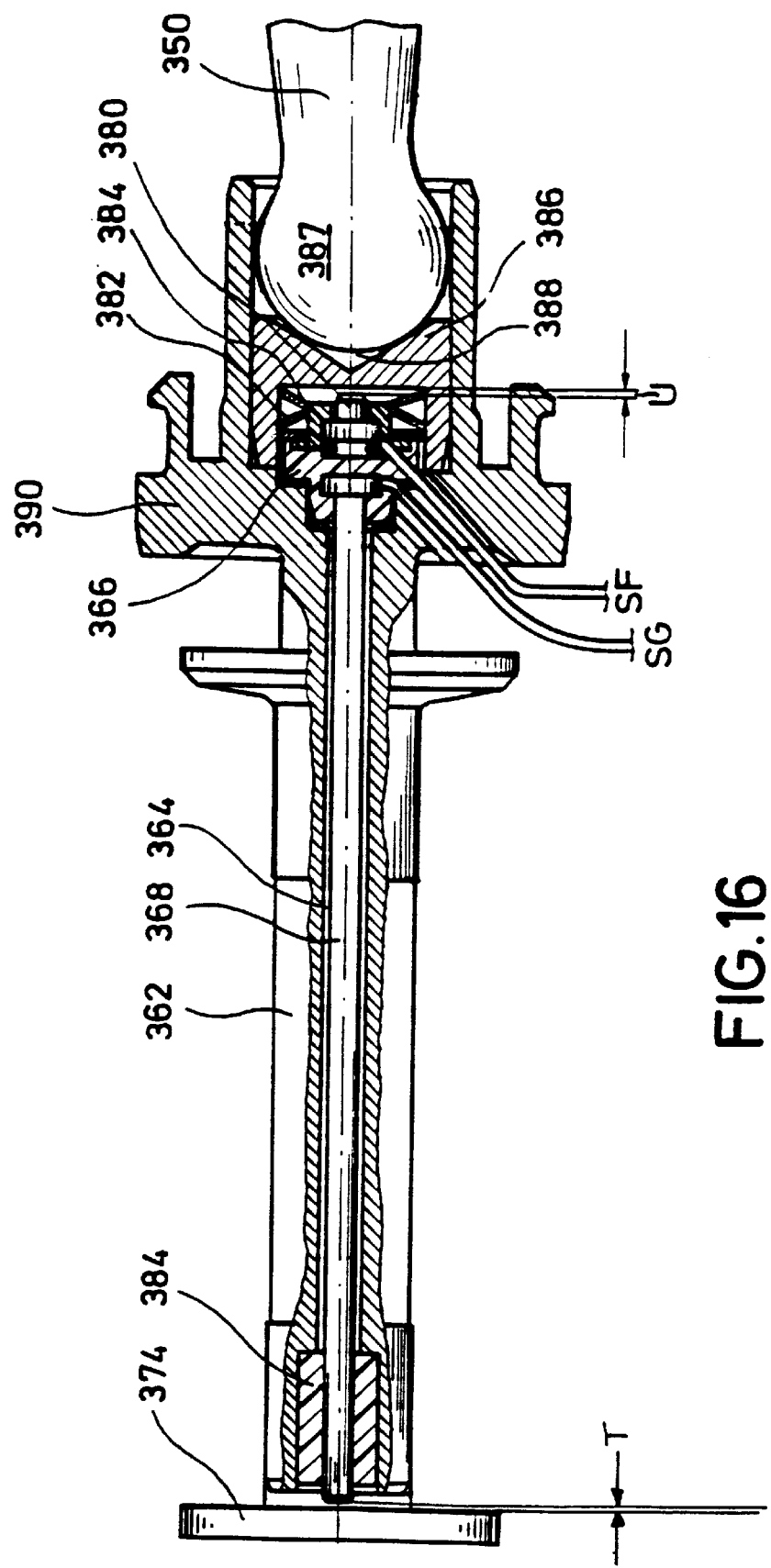
FIG. 16 shows a partial enlarged view of a switch means to be used in the embodiment of FIG. 11.

The embodiment shown in FIG. 16 differs from the embodiment shown in FIG. 11 in so far, that a contact element 380 is provided on the head 366 of the contact member. This contact member is surrounded by two disc springs 382, 384 which, in the non-activated position keep a trigger member 386 at a predetermined distance U from the contact member. This trigger member 386 is provided with a seat 388 for the distal end 387 of the actuating member 350. Upon an axial movement of the first actuator 350 by the distance U, a signal SF is triggered by the contact element 380. Again, this contact element 380 is mounted between the head portion 366 and the trigger member 386 so as to be electrically insulated from the head portion 366.

In the embodiment of FIG. 16, the distance U between the contact element 380 and the trigger member 350, as well as the spring force of the spring arrangement 382, 384 disposed between the trigger member 386 and the contact element 380, and the distance T between the pin 368 and the plate 374 as well as the spring arrangement 370 (in the embodiment of FIG. 11) between the head portion 366 and the stepped bore 364 are dimensioned such that upon the actuator 350 returning from an operative position into an inoperative position, the contact element 380 and the trigger member 386 are released from each other before the end portion 373 of the pin 368 is released from plate 374. This also means, that the contact element 380 and the trigger member 386 come into contact before the free end 373 of the pin 368 comes into contact with the plate 374 when the actuator 350 is moved from an inoperative position to an operative position. Since the physical properties of the springs 382, 384 and 370, respectively, are known as well as the distances T, T1 and U, respectively, it is possible to determine the condition for release of the electronically controlled booster from the time delay between the two signals SF and SG.

The embodiment of FIG. 16 is mounted in a electrically insulating housing 390.

The plate 374 can also be electrically insulated from the break booster housing and be connected to a specific electric potential so that defined electrical signals can be provided to the electronic control device.

In the afore-mentioned embodiments of FIGS. 11–16, the signal generation means provided a ground signal to the electronic control device when the actuating member or the pin contacted the signal generation means. Due to the various electronic devices in a vehicle, noise and electromagnetic radiation interferences may be superimposed on the ground potential. This results in problems when further processing the signals in a subsequent electronic control device. In order to overcome such problems the embodiment of FIGS. 17 to 19 may be used as an alternative.

Figure 17:
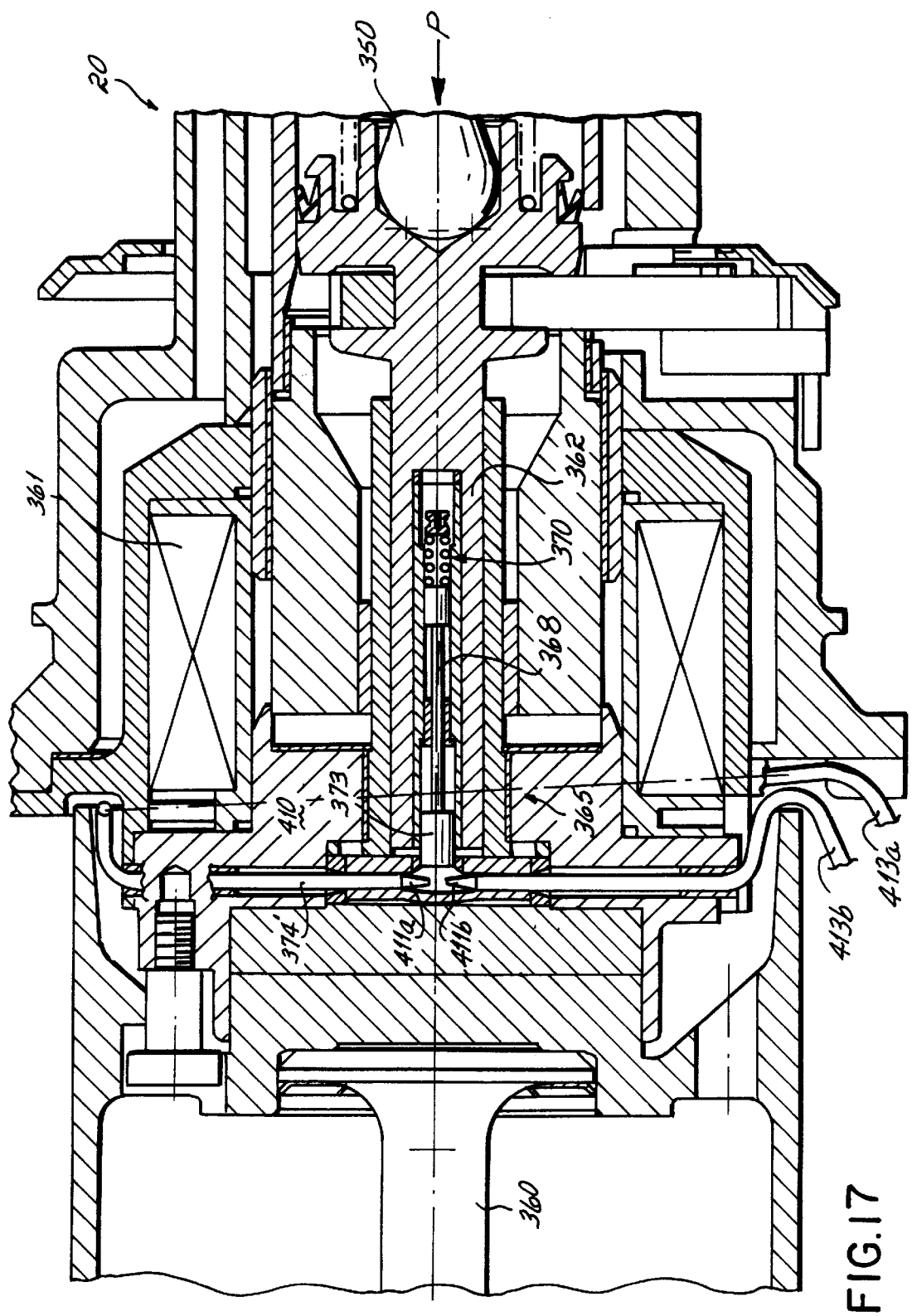
FIG. 17 shows a further embodiment of a control valve for a brake booster in an enlarged sectional view.

The embodiment of FIG. 17 corresponds to the embodiment of FIG. 11 in as far as the valve means 20, the electromagnetic actuation 361, the first and second actuation means 250 and 360 etc. are concerned. The signal generation means 365 are altered in the following manner: instead of having a uniform metallic plate 374 (as i.e. in FIG. 11), the plate 374' of FIG. 17 is provided with at least two contact areas which are electrically isolated from each other. The plate and its contact areas are mounted in an electrically isolated manner in the metallic ring 410. When the free end 373 of the pin 368 which is electrically conducting, comes into contact with the (at least two) contact areas 411a and 411b of the plate 374' in the operative position of the actuation means 350, the contact areas are bridged by the pin. The pin 368 is electrically insulated from the sleeve 362. The two contact areas 411a, 411b are provided with wires 413a, 413b which lead to the (not shown) electronical control device.

It is certainly possible to provide more than two contact areas 411a, 411b in order to increase the security of the signal generation. This however, requires further wires 413a, 413b as well as signal input terminals at the electronical control device.

The pin 368 is supported by a spring arrangement 370 at the end of pin 368 opposite to the free end 373 in order to provide for a contact making and contact braking between the free end 373 and the contact areas 411a and 411b.

Figure 18:
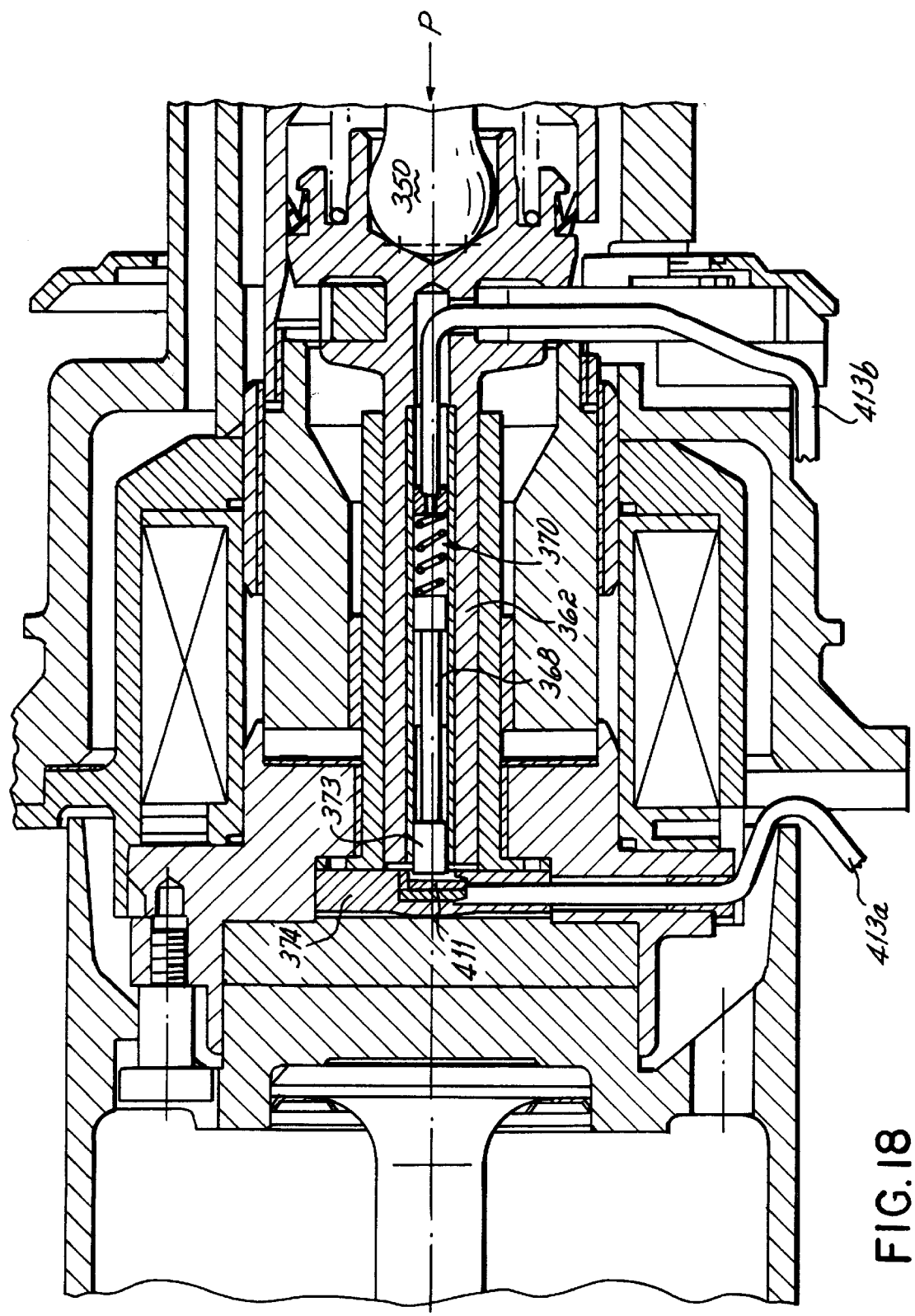
FIG. 18 shows a further embodiment of a control valve for a brake booster in an enlarged sectional view.

In the embodiment of FIG. 18, the plate 374 is provided with one (or more) contact areas 411 that is electrically insulated against the contact plate 374. It is, however, also possible to have the entire contact plate 374 be insulated against the ground potential of the metallic parts surrounding the plate 374. The contact area 411 can be brought into electrical and mechanical contact with the free end 373 of the pin 368 which is biased by a spring arrangement 370 in the direction towards the plate 374 and electrically insulated against the sleeve 362. The contact area 411 and the free end 373 of the pin 368 are provided with wires 413a, 413b which lead to the (not shown) electronical control device.

Figure 19:
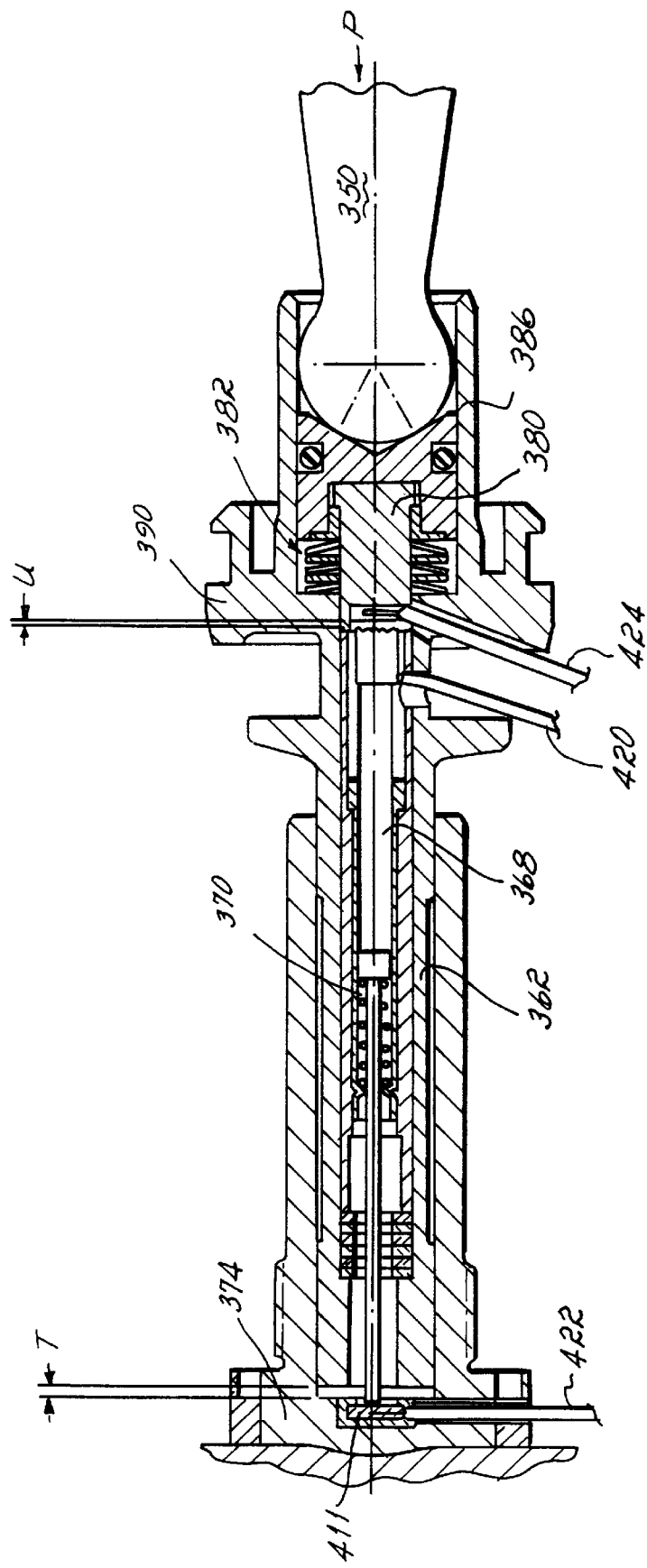
FIG. 19 shows a partial enlarged view of a further switch means to be used in the embodiment of FIG. 11.

FIG. 19 shows a modification of the switch means shown in FIG. 16. The main difference lies in the fact that a common signal input wire 420 leads to the pin 368 and that the plate 374 is provided with a first signal output wire 422 connected to a contact area 411 mounted in the plate 374 and a second signal output wire 422 connected to the spring loaded contact member 380. Again, the pin 368 is resiliently biased by a spring arrangement 370 and electrically insulated against the sleeve 362.

With the signals provided by the afore-mentioned embodiments of FIG. 11 to 19, it is possible to sense the brake roll back. This is explained hereinafter with reference to FIG. 19. Upon operation of the brake pedal by the driver, the actuating means 350 is moved in the direction of the arrow P. Due to the dimensioning of the spring arrangements 370, 382 and the distances T and U in the first and second signal generation means, a first signal is provided at the wire 422. Upon a further movement of the first actuation means 350 into the direction of the arrow P, the spring arrangement 382 is compressed so that the path U is overcome and a second signal is provided after a time period depending on the force and speed with which the driver is operating the brake pedal, at the other wire 424.

In case the time difference between the occurrence of the first and the second signal is shorter than a predetermined period of time, the electronic activation of the valve means by operating the solenoid can be triggered by the electronic control device.

From the order of occurrence of the first and second signals provided by the first and second signal generation means, the different operation modes of the braking system can be sensed and distinguished. Depending on the dimensioning of the spring arrangements and the free general path of the first actuation means 350 and the pin 368, the first and second signals are provided in a certain order when the brake pedal is pressed and these signals will also occur in a specific order when the brake pedal is released by the driver. During the period of time when the brake pedal is held down in a depressed position, both signal are present simultaneously. Thus, the dynamics of the pressing down and releasing of the brake pedal can be determined from the order in which the signals from the first and second signal generation means are generated.

This means that not only the aspect of redundancy can be successfully handled by providing two (or more) independent signal generation means, but is also possible to detect and/or to determine critical and characteristic points in the path of the brake pedal actuation by a driver. If for example, the brake pedal is activated with a actuating force exceeding a certain threshold value and/or exceeding a predetermined actuation speed, the signals from the first and from the second signal generation means will occur within a predetermined period of time. If thereafter, a driver will release a brake pedal just slightly, only one of the two signal generation means will be released again and one of the signals will disappear, while the other signal will still be remain present. Only when the driver fully releases the brake pedal, the other signal generation means will sense this and the signal resulting from that signal generation means will also disappear.

This fail-safe and very efficient way of sensing the brake pedal operation is very effective and can be achieved by very reliable and cost-effective means.

We claim:

1. A vehicle brake system comprising:
    an electronically adjustable brake booster (10) which is adapted to terminate an automatic braking operation of a motor vehicle when the braking operation is initiated automatically by a control unit in response to the actuation of a brake pedal in the direction of an operative position, the automatic braking operation being terminated once an interruption criterion is fulfilled, and
    switch means (88, 90) composed of an actuating element (90) and a switching element (88) movable relative to the actuating element (90), wherein one of the two elements (88, 90) is connected with an actuator (22) which is operatively connected to the brake pedal and wherein the other of the two elements (88 or 90) performs a relative movement with respect to the actuator (22) within a defined play for movement (S) upon a movement of the brake pedal in the direction of its inoperative position;
    whereby said relative movement of said other of the two elements (88 or 90) initiates a switching process of the switch means (88, 90) and the switching process causes the interruption criterion of the automatic braking operation.

2. The system according to claim 1 characterized in that the switching element (88) is arranged on a control housing (42) of the brake booster and the actuating element (90) on a valve piston (48) that is connected with the actuator (22), the actuator (22) being slidable in longitudinal direction along the control housing (42).

3. The vehicle brake system according to claim 1 characterized in that the actuator (22) acts on a disk (70) that is adapted to engage a member (60) onto which a hydraulic force opposed to the movement of the actuator (22) that is caused by the brake pedal may act, which, in turn, effects a countermovement of the disk (70) and the actuator (22), wherein the movability of the disk (70) in the direction of the actuator (22) is limited by a stop means (72), and the distance (A) of the stop means (72) from the abutment (90) is dimensioned such that, when the disk (70) abuts the stop means (72), a path limiting element (80) operatively connected to the actuator (22) still has to cover a distance (S) in the direction of the abutment (90) to actuate the switching element (88).

4. The vehicle brake system according to claim 3 characterized in that the distance (S) is dimensioned so as to exclude erroneous operation of the switching element (88) due to a resetting of the actuator (22) or the disk (72) by the hydraulic force supplied by the brake system.

5. The vehicle brake system according to claim 3, characterized in that the switching element (88) is operatively connected to the path limiting element (80).

6. The vehicle brake system according to claim 3, characterized in that the switching element (88) together with the abutment (90) are slidable with respect to another abutment (92) coaxially to the actuator (22).

7. The vehicle brake system according to claim 3, characterized in that the distance (S) is dimensioned so as to exclude erroneous operation of the switching element (88) due to pressure impacts caused by an ABS-mode of operation, which impacts are directed against the force exerted by the brake pedal and result in a relative movement between the abutment (90) and the path limiting element (80) operatively connected to the actuator (22).

8. The vehicle brake system according to claim 1, characterized in that a spring element (54, 68) applies a spring force to the actuator (22) so that, in the absence of a force acting on the brake pedal, the actuator (22) returns from an operative position to an inoperative position in which the switching element (88) supplies a signal.

9. The vehicle brake system as claimed in claim 3, characterized in that the path limiting element (80) is a clamping element encircling the actuator (22).

10. The vehicle brake system according to claim 9, characterized in that the switching element (88) is detachably mounted to the path limiting element (80).

11. The vehicle brake system as claimed in claim 1, characterized in that a signal supplied by the switching element (88) to the control unit is evaluated following a previous initiation of a maximum brake boosting operation in the vehicle brake system such that the brake booster (10) is returned to its normal brake boosting operation.

12. The vehicle brake system according to claim 1, characterized in that the switching element (88) is disposed in the abutment (90).

13. The vehicle brake system according to claim 1, characterized in that the actuator (22) upon actuation of the brake pedal triggers a brake boosting operation by the brake booster and upon release of the brake pedal after a braking operation switches an electric switch (88) into a first condition in which it supplies a signal to the electronic control of the brake booster to reduce the brake boosting operation, and wherein the electric switch (88) is switchable into a second condition upon a braking operation in which it does not supply a signal for terminating a brake boosting operation and in which its function is monitored.

14. The vehicle brake system according to claim 13 characterized in that the switch (88) comprises a movable part (140) which adjusts the two conditions and which is movable both by a member (142) that is stationary with respect to the housing (12) of the brake booster (10) and by a member (42, 90) that is movable with respect to the housing (12) of the brake booster (10).

15. The vehicle brake system according to claim 1, characterized in that the switching element (88) is composed of two switches (144, 146) that are actuated via a common member (10) impinged upon by the actuating element (90), and wherein one of the switches is designed as a closing means and the other as an opening means.

16. The vehicle brake system according to claim 1, characterized in that readjusting springs (54, 68) are provided in the brake booster (10) which urge the actuator (22) back from an actuating position of the brake booster, wherein a valve closure member (44) is lifted off its valve seat so as to establish a pressure compensation between a front and a rear pneumatic chamber (16, 14) as the brake pedal is released nearly completely.

17. The vehicle brake system according to claim 16, characterized in that in the brake pedal released position the switching element (88) abuts the actuator, so that an actuation of the switching element (88) is affected and as a result a signal is supplied to the control unit.

* * * * *